US011921456B2

(12) United States Patent
Oh et al.

(10) Patent No.: US 11,921,456 B2
(45) Date of Patent: Mar. 5, 2024

(54) DRIVING COUPLER HAVING LOCKING STRUCTURE AND POWER TRANSMISSION STRUCTURE

(71) Applicant: Hewlett-Packard Development Company, L.P., Spring, TX (US)

(72) Inventors: Pil-Seung Oh, Seongnam-si (KR); Taeil Jung, Seongnam-si (KR); Tae-Hee Kim, Seongnam-si (KR); Chang-Woo Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/113,033

(22) Filed: Feb. 22, 2023

(65) Prior Publication Data

US 2023/0195029 A1 Jun. 22, 2023

Related U.S. Application Data

(63) Continuation of application No. 17/704,406, filed on Mar. 25, 2022, now Pat. No. 11,614,708, which is a (Continued)

(30) Foreign Application Priority Data

Mar. 11, 2019 (KR) ........................ 10-2019-0027677

(51) Int. Cl.
*G03G 15/04* (2006.01)
*G03G 21/16* (2006.01)

(52) U.S. Cl.
CPC ..... *G03G 21/1647* (2013.01); *G03G 21/1676* (2013.01)

(58) Field of Classification Search
CPC . G03G 15/04; G03G 21/1647; G03G 21/1676
(Continued)

(56) References Cited

U.S. PATENT DOCUMENTS 5,920,753 A 7/1999 Sasaki et al.
6,343,192 B1 1/2002 Miyabe et al.
(Continued)

FOREIGN PATENT DOCUMENTS

CN 103823343 A 5/2014
CN 104076673 A 10/2014
(Continued)

*Primary Examiner* — Hoan H Tran
(74) *Attorney, Agent, or Firm* — Foley & Lardner LLP

(57) ABSTRACT

An example image forming apparatus includes a frame, a first shaft supported by the frame, and a first coupler. The first coupler includes a body coupled to one end of the first shaft and a first protrusion protruding from the body in an axial direction of the first shaft, the first protrusion having a first surface and a second protrusion protruding from the first surface. The second protrusion is to lock with a groove to mount a cartridge on the frame, the first shaft is to provide a rotational force in a first rotational direction to rotate the second protrusion of the first coupler and to insert the second protrusion into the groove to lock with the cartridge, and the first surface of the first protrusion of the first coupler is to contact a second surface to transmit the rotational force to the second coupler in the first rotational direction.

20 Claims, 12 Drawing Sheets

Related U.S. Application Data continuation of application No. 17/299,922, filed as application No. PCT/US2019/066307 on Dec. 13, 2019, now Pat. No. 11,314,197.

(58) Field of Classification Search
USPC .......................... 399/107, 110, 111, 119, 120
See application file for complete search history.

(56) References Cited

U.S. PATENT DOCUMENTS

| | | | |
|---|---|---|---|
| 6,892,042 B2 | 5/2005 | Jang et al. | |
| 8,942,599 B2 * | 1/2015 | Kim | G03G 21/1647 399/167 |
| 9,213,303 B2 | 12/2015 | Maul | |
| 9,829,855 B2 | 11/2017 | Leemhuis et al. | |
| 10,180,654 B2 | 1/2019 | Kim | |
| 2009/0016779 A1 | 1/2009 | Hwang | |
| 2010/0054823 A1 | 3/2010 | Takasaka et al. | |
| 2010/0303503 A1 | 12/2010 | Woo | |
| 2011/0274461 A1 | 11/2011 | Imai | |
| 2012/0087699 A1 | 4/2012 | Wu et al. | |
| 2015/0168909 A1 | 6/2015 | Maul | |
| 2016/0062312 A1 | 3/2016 | Shimizu | |

FOREIGN PATENT DOCUMENTS

| | | | |
|---|---|---|---|
| CN | 107272372 | * | 10/2017 |
| EP | 2259156 | A2 | 12/2010 |
| JP | 2005-208683 | A | 8/2005 |
| JP | 2011-064846 | A | 3/2011 |

* cited by examiner

DRIVING COUPLER HAVING LOCKING STRUCTURE AND POWER TRANSMISSION STRUCTURE

CROSS-REFERENCE TO RELATED APPLICATIONS

This application claims priority under 35 U.S.C. § 120 as a Continuation Patent Application of U.S. patent application Ser. No. 17/704,406, filed Mar. 25, 2022, which is a Continuation of U.S. patent application Ser. No. 17/299,922, filed Jun. 4, 2021, now U.S. Pat. No. 11,314,197, which is a U.S. National Stage Entry under 35 U.S.C. § 371 of International Application No. PCT/US19/066307, filed Dec. 13, 2019, which claims priority to and the benefit of South Korea Patent Application No. 10-2019-0027677, filed Mar. 11, 2019 in the Korean Intellectual Property Office, the contents of all such applications being hereby incorporated by reference in their entirety and for all purposes as if completely and fully set forth herein.

BACKGROUND

An image forming apparatus is an apparatus for forming an image on a recording medium according to an input signal. Representative examples of the apparatus include a printer, a copy machine, a facsimile, or a multifunction peripheral (MFP) that integrally implements these functions.

An electrophotographic image forming apparatus, which is a kind of image forming apparatus, includes a developing cartridge including a photosensitive drum and a developing roller and a light exposing unit. The light exposing unit forms an electrostatic latent image on the surface of the photosensitive drum by scanning light onto the photosensitive drum charged at a predetermined potential, and supplies a toner to the photosensitive drum having the electrostatic latent image formed thereon to form a visible image.

The developing cartridge is an assembly of components for forming a visible image, and detachably attached to a body of an image forming apparatus. Also, it is consumable and is replaced by new one when life span is over.

DETAILED DESCRIPTION

Hereinafter, various examples of the disclosure will be described in detail with reference to the accompanying drawings. The examples to be described below may also be modified in various forms. In order to more clearly describe features of the examples, a detailed description of matters which may be well known to those to skilled in the art to which the examples may pertain may be omitted.

Meanwhile, in the specification, a case in which any component is "connected" with another component includes a case in which any component is 'directly connected' to another component and a case in which any component is 'connected to another component while having the other component interposed therebetween'. In addition, a case in which any component "comprises" another component means that any component may further comprise other components, not exclude other components, unless explicitly described to the contrary.

In addition, an "image forming apparatus" refers to a device for printing print data generated from a terminal such as a computer on a recoding paper. Examples of the image forming apparatus described above may include a copier, a printer, a facsimile, a multi-function printer (MFP) of complexly implementing functions thereof through a single device, and the like. The image forming apparatus may mean all devices capable of performing an image forming task, such as the printer, the scanner, the fax machine, the multi-function printer (MFP), or a display.

The disclosure is not limited to an example disclosed below and may be implemented in various forms and the scope of the disclosure is not limited to the following examples. In addition, all changes or modifications derived from the meaning and scope of the claims and their equivalents should be construed as being included within the scope of the disclosure. In the following description, the configuration which is publicly known but irrelevant to the gist of the disclosure could be omitted. In addition, the attached drawings are not drawn to scale to facilitate understanding of the disclosure, but the dimensions of some of the components may be exaggerated.

Figure 1:
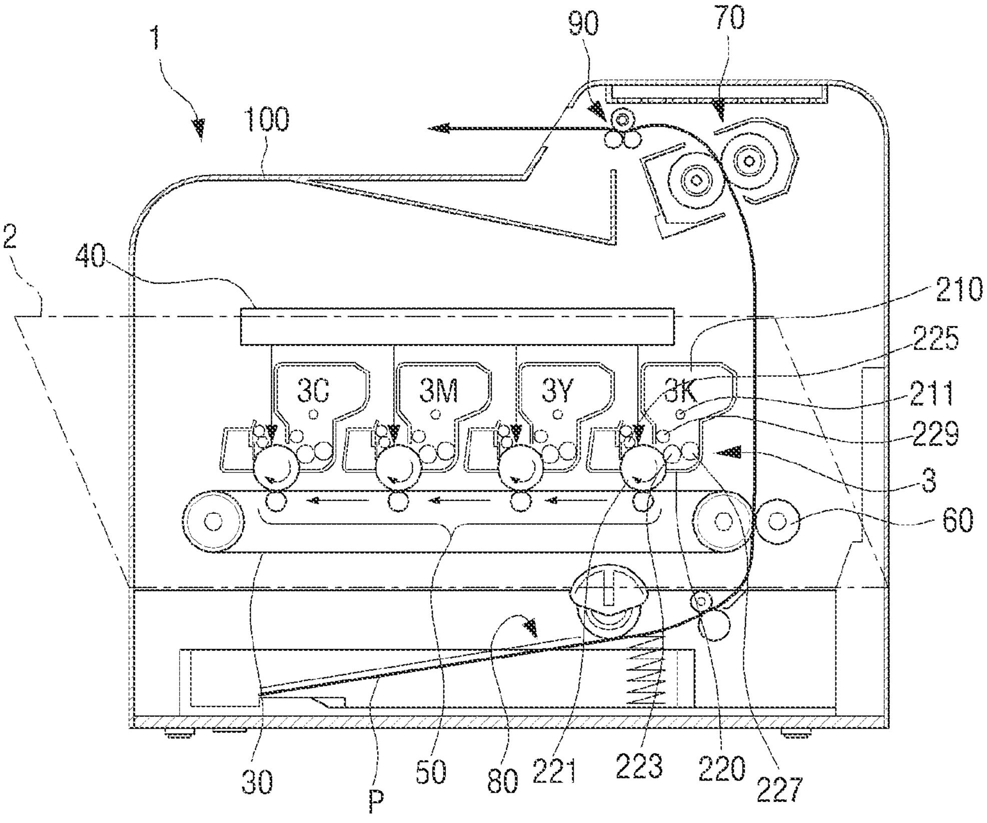
FIG. 1 is a schematic configuration view illustrating an image forming system according to an example.

FIG. 1 is a schematic configuration view illustrating an image forming system according to an example.

Referring to FIG. 1, an image forming apparatus 1 may include a main body 100, and at least one developing cartridge 200 detachably attached to the main body 100.

Each of a plurality of developing cartridges 200 may be attached to or detached from the main body 100 by opening the front portion of the main body 100 by opening a door 2. FIG. 1 illustrates that the door 2 is provided to open and close the front portion of the main body 100, but is not limited thereto. The door 2 may be provided to open and close the side portion or the upper portion of the main body 100.

Each of the plurality of developing cartridges 200 may be detached from the main body 100 when the toner contained therein is used, and a new developing cartridge 200 may be mounted on the main body 100.

The developing cartridge 200 may be supported to be mounted on or detached from the main body 100.

The plurality of developing cartridges 200 may include a plurality of developing cartridges 200C, 200M, 200Y, and 200K for developing toners of cyan (C: cyan), magenta (M: magenta), yellow (Y: yellow), and black (K: black). However, the disclosure is not limited thereto, but may further include the developing cartridge 200 for accommodating and developing toners of various colors such as light magenta, white, etc. in addition to the above-described colors.

The developing cartridge 200 may include a toner accommodation unit 210 and a developing unit 220. The toner accommodated in the toner accommodation unit 210 may be supplied to the developing unit 220. The toner accommodation unit 210 may be provided with a stirring member 211 for stirring the toner and supplying the toner to the developing unit 220.

The developing unit 220 may be provided with a photosensitive drum 221 on which an electrostatic latent image is formed, and a developing roller 223 for supplying the toner to the photosensitive drum 221. The photosensitive drum 221 may be an example of a photosensitive body on which an electrostatic latent image is formed, including a conductive metal pipe and a photosensitive layer formed on its circumference.

The surface of the photosensitive drum 221 may be charged by a charger to have a uniform surface potential. A charging roller 225 may be an example of a charger. A charging brush, a corona charger, etc. may be used instead of the charging roller 225. The developing roller 223 may contact the photosensitive drum 221 to rotate, and supply toner to the surface of the photosensitive drum 221. A supply roller 227 that supplies the toner in the developing unit 220 to the developing roller 223 may be mounted on the developing unit 220.

The developing unit 220 may be further provided with a developing stirring member 229 for stirring the toner therein. For example, the developing stirring member 229 may have the same form as the stirring member 211.

The developing cartridge 200 may be an integrated developing cartridge in which the toner accommodation unit 210 and the developing unit 220 are integrally formed.

The charging roller 225 may charge the photosensitive drum 221 of a plurality of developing cartridges 200C, 200M, 200Y, and 200K to a uniform surface potential.

The light exposing unit 40 may irradiate light modulated corresponding to image information into the photosensitive drum 221 so that an electrostatic latent image may be formed on the photosensitive drum 221. The light exposing unit 40 may irradiate a plurality of light modulated corresponding to image information of colors on to the photosensitive drum 221 of the plurality of developing cartridges 200C, 200M, 200Y, and 200K and form an electrostatic latent image onto the photosensitive drum 221. The electrostatic latent image of the photosensitive drum 221 of the plurality of developing cartridges 200C, 200M, 200Y, and 200K may be developed to a visible toner image by C, M, Y, and K toners accommodated in the plurality of developing cartridges 200C, 200M, 200Y, and 200K. The developed toner images may be intermediately transferred to an intermediate transfer belt 30 sequentially.

The intermediate transfer belt 30 may temporarily accommodate the toner image developed onto the photosensitive drum 221 of the plurality of developing cartridges 200C, 200M, 200Y, and 200K. A plurality of intermediate transfer rollers 50 may be disposed at positions facing the photosensitive drum 221 of the plurality of developing cartridges 200C, 200M, 200Y, and 200K with the intermediate transfer belt 30 interposed therebetween.

The transfer roller 60 may be disposed facing the intermediate transfer belt A transfer bias for transferring the toner image transferred to the intermediate transfer belt 30 to a recording medium P may be applied to the transfer roller 60.

According to an example, it has been described that the image developed onto the photosensitive drum 221 is intermediately transferred to the intermediate transfer belt 30, and then to the recording medium P passing between the intermediate transfer belt 30 and the transfer roller 60, but is not limited thereto. The recording medium P may directly pass between the intermediate transfer belt 30 and the photosensitive drum 221 and transfers the image directly developed to the recording medium P.

A fixing unit 70 may apply heat or pressure to the toner image transferred to the recording medium to be fixed to the recording medium P.

The recording medium P loaded in a paper feeder 80 may be conveyed between the transfer roller 60 and the intermediate transfer belt 30. The toner image intermediately transferred on the intermediate transfer belt 30 by the transfer bias applied to the transfer roller 60 may be transferred to the recording medium P. When the recording medium P passes through the fixing unit 70, the toner image may be fixed to the recording medium P by heat and pressure. The recording medium P to which the toner image is fixed may be discharged by a discharge roller 90.

Figure 2:
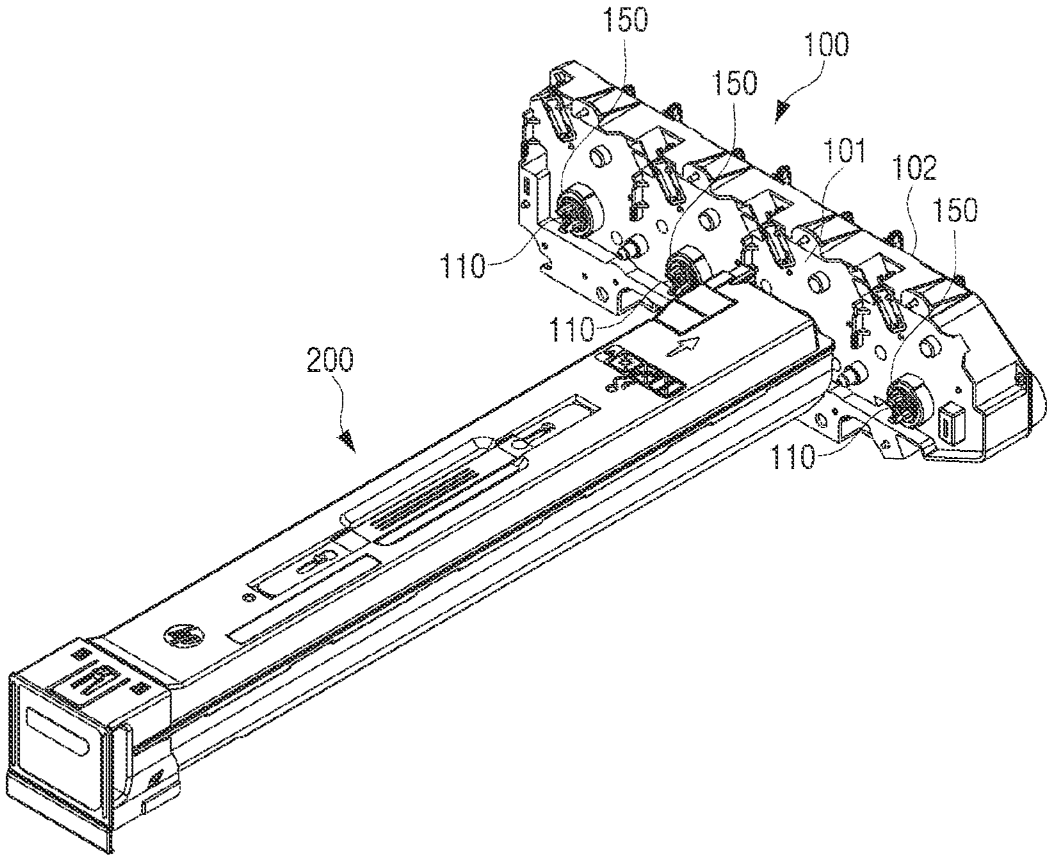
FIG. 2 is a perspective view illustrating a developing cartridge and part of a body on which the developing cartridge is mounted according to an example.

FIG. 2 is a perspective view illustrating a developing cartridge and part of a body on which the developing cartridge is mounted according to an example.

Referring to FIG. 2, an image forming apparatus 1 according to an example may include a main body 100, at least one developing cartridge 200 detachably attached to the main body 100 and driving with the received driving force of a driving shaft 110, and a driving coupler 150 disposed on the driving shaft 110 and transmitting a driving force to the developing cartridge 200.

The main body 100 may be fixedly mounted in the image forming apparatus 1. The driving shaft 110 connected to a driving motor 120 (see FIG. 3) may be supported in the main body 100. The driving shaft 110 may be supported by a first frame 101 and a second frame 102 which are the part of the main body 100. The driving shaft 110 may protrude from the first frame 101, and the developing cartridge 200 may be mounted toward the first frame 101.

The driving shaft 110 may receive power of the driving motor 120 and rotate in first and second directions. The driving coupler 150 may be disposed on one end of the driving shaft 110 and rotate in the first and second directions together with the driving shaft 110.

The driving shaft 110 and the driving coupler 150 may be disposed to correspond to the position where the developing cartridge 200 is mounted on the main body 100. The driving shaft 110 and the driving coupler 150 may be disposed to correspond to each of 4 (four) developing cartridges 200 one by one.

For ease of explanation, FIG. 2 illustrates a single developing cartridge 200, and driving coupler 150 for transmitting power to the developing cartridge 200. The driving coupler may be disposed on the left or right of the illustrated developing cartridge 200.

The developing cartridge 200 may be detachably attached to the main body 100 of the image forming apparatus. When the developing cartridge 200 is mounted on the main body 100, the passive coupler 250 (see FIG. 3) included in the developing cartridge 200 may be engaged with the driving coupler 150, so that the power of the driving coupler 150 may be transmitted to the developing cartridge 200 through the passive coupler 250.

To be specific, the rotational members of the developing cartridge 200, for example, the photosensitive drum 221, the developing roller 223, the developing stirring member 229, the supply roller 227, the stirring member 211, etc. may be connected to the driving motor 120 provided in the main body 100 to rotationally drive.

Each developing cartridge 200 may receive power from the driving shaft 110 through the driving coupler 150, and the driving shaft 110 may drive the developing roller 223. FIG. 2 illustrates that each developing cartridge 200 receives power from a single driving shaft 110, but is not limited thereto. Each developing cartridge 200 may receive a driving force from at least one driving shaft 110.

Figure 3:
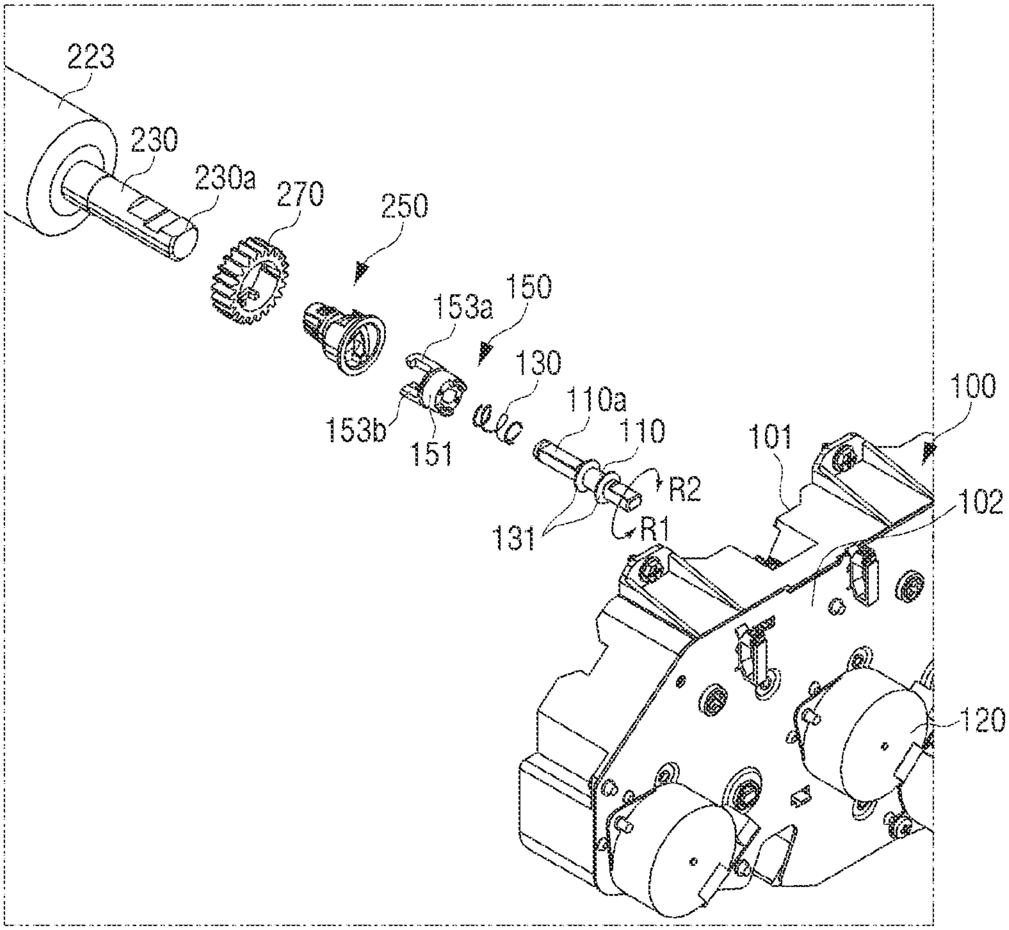
FIG. 3 is an exploded perspective view illustrating a developing cartridge of FIG. 2, a passive coupler, and a driving coupler.

FIG. 3 is an exploded perspective view illustrating a developing cartridge of FIG. 2, a passive coupler, and a driving coupler. FIG. 3 is an exploded perspective view in the direction of the main body 100, and for ease of explanation, other components of the developing cartridge 200 will be omitted, but only the developing roller 223 that receives the driving force of the driving shaft 110 will be described.

When the developing cartridge 200 is mounted on the main body 100, the image forming apparatus 1 may include a driving coupler 150 for transmitting a driving force of the driving shaft 110 to the passive coupler 250, and a passive coupler 250 for transmitting the driving force of the driving shaft 110 to the rotational shaft 230.

The driving motor 120 may be disposed on the other side of the second frame 102. The driving motor 120 may rotationally drive in the first or second direction to provide the driving force to the driving shaft 110.

The driving motor 120 may rotate in the first direction in printing, and in the second direction when the developing cartridge 200 is replaced. The driving shaft 110 may receive the power of the driving motor 120 to rotate.

The driving coupler 150 may be a configuration included in the main body 100. The driving coupler 150 may be coupled to the driving shaft 110 and integrally rotated together with the driving shaft 110.

When the driving shaft 110 rotates in the first direction, the passive coupler 250 included in the developing cartridge 200 may be locked to the driving coupler 150 connected to the driving shaft 110, and may contact the part of the driving coupler 150 to rotate in the first direction. In this case, the driving coupler 150 may be in surface contact with the passive coupler 250 along a rotational direction of the driving coupler 150 and transmit a driving force to the developing cartridge 200.

When the driving shaft 110 rotates in the second direction, the passive coupler 250 may be unlocked from the driving coupler 150, and the passive coupler 250 may be spaced apart from the driving coupler 150. Thus, the coupling there between may be released to block power transmission.

The structure in which the developing cartridge 200 may be locked to the main body 100 by the driving coupler 150 and the passive coupler 250, and receive the driving force from the main body 100 will be described in detail below.

The driving coupler 150 may include a cylindrical body 151 coupled to one end of the driving shaft 110, and an axial protrusion 153 extended along the driving axial direction from the one end of the body 151.

The body 151 may have a cylindrical shape, and an inner circumferential surface may be formed to correspond to D-cut part 110*a* formed on a shaft end of the driving shaft 110. The axial protrusion 153 may extend in a direction opposite to the main body 100 from one end of the body 151.

The driving coupler 150 may be disposed to reciprocate in the direction of the driving shaft 110.

An elastic member 130 may be disposed between the driving coupler 150 and the driving shaft 110. The elastic member 130 may provide an elastic force to the driving coupler 150 toward the passive coupler 250 in the direction of the driving shaft 110.

An elastic support member washer 131 for supporting an elastic member 130 may be disposed in the driving shaft 110. The elastic support member washer 131 may be inserted into the groove formed in the driving shaft 110. One end of the elastic member 130 may be supported by the elastic member support washer 131, and the other end may be supported by an elastic member seating surface (not show) which is the other side of the driving coupler 150.

The developing cartridge 200 may include a rotational shaft 230 and a passive coupler 250 for transmitting the driving force of the main body 100 to the rotational shaft 230.

The rotational shaft 230 may receive power from the driving shaft 110 to rotationally drive. FIG. 3 illustrates that the rotational shaft 230 is the rotational shaft of the developing roller 223, but is not limited thereto. The rotational shaft 230 may be the rotational shaft 230 of rotational members of the developing cartridge 200, for example, the photosensitive drum 221, the developing roller 223, the developing stirring member 229, the supply roller 227, the stirring member 211, etc.

The passive coupler 250 may be a configuration included in the developing cartridge 200. The passive coupler 250 may be coupled to the D-cut part 230*a* provided one end of the rotational shaft 230 of the developing roller 223. Accordingly, the driving force may be transmitted to the rotational shaft 230 of the developing roller 223 by the rotation of the passive coupler 250. The rotational shaft 230 of the developing roller 223 and the driving shaft 110 may be disposed to coincide with each other.

The passive coupler 250 may have a cylindrical shape to correspondingly fit into the axial protrusion 153 of the driving coupler 150.

A gear 270 may be coupled to the outer side of the passive coupler 250. Other rotational members except for the developing roller 223 (e.g., the photosensitive drum 221, the developing roller 223, the developing stirring member 229, the supply roller 227, the stirring member 211, etc.) may receive the driving force that the passive coupler 250 receives through the gear 270 to rotationally drive.

Figure 4:
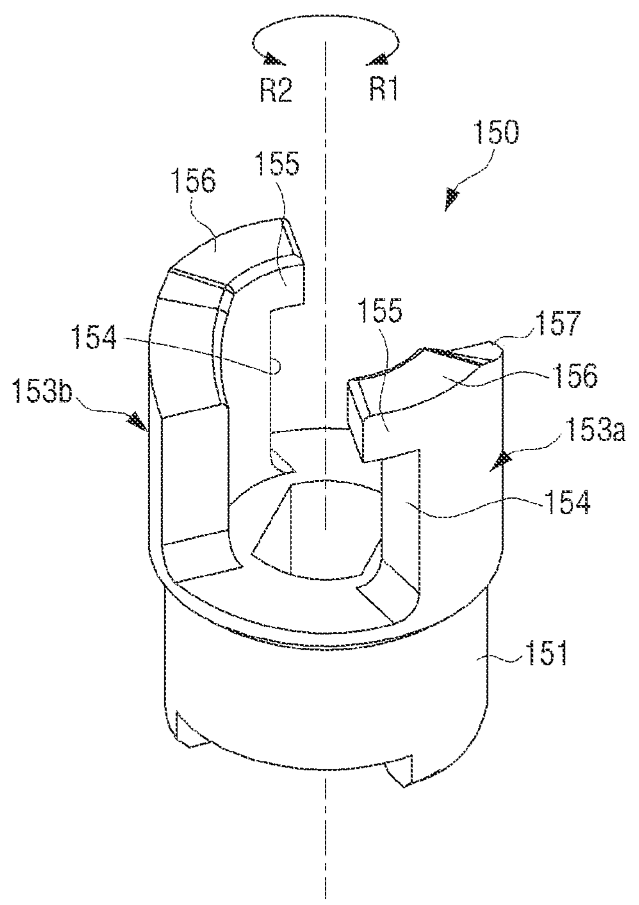
FIG. 4 is a perspective view illustrating a driving coupler according to an example.

FIG. 4 is a perspective view illustrating a driving coupler according to an example.

Referring to FIG. 4, the driving coupler 150 may include the body 151 and the axial protrusion 153.

The body 151 may have a cylindrical shape and be coupled to the driving shaft 110 to rotate in a first direction R1 and a second direction R2 together with the driving shaft 110.

Axial protrusions 153*a* and 153*b* may extend in the direction of the passive coupler 250 from one end of the body 151. The axial protrusions 153*a* and 153*b* may include a plurality of axial protrusions, and spaced apart from one another at a predetermined space along the inner circumferential surface of the body 151. To be specific, the axial protrusion 153 may consist of a first axial protrusion 153*a* and a second axis protrusion 153*b*. The first axial protrusion 153*a* and the second axis protrusion 153*b* may be formed to be symmetrical based on the driving shaft 110. The first axial protrusion 153*a* and the second axis protrusion 153*b* may be formed to be the same as each other. Thus, for ease of explanation, the first axial protrusion 153*a* and the second axis protrusion 153*b* will be referred to the axial protrusion 153.

The axial protrusion 153 may include a driving force transmission surface 154 contacting the part of the passive coupler 250 by the rotation of the driving shaft 110. The driving force transmission surface 154 may be formed of one side surface in the first rotational direction of the axial protrusion 153. The driving force transmission surface 154 may contact a driving force receiving surface 254 (see FIG. 5) of the passive coupler 250 and transmit the driving force of the driving shaft 110 to the passive coupler 250.

The axial protrusion 153 may include a locking protrusion 155 protruding from the driving force transmission surface 154 for fixing the coupling between the driving coupler 150 and the passive coupler 250. The locking protrusion 155 may protrude along the outer circumferential surface of the body 151, or may protrude in the first rotational direction R1. The locking protrusion 155 may have a predetermined length to be inserted into a locking groove 255 (see FIG. 5) of the passive coupler 250.

The locking protrusion 155 may protrude from one end of the driving force transmission surface 154. The locking protrusion 155 may be formed on one end opposite to the other end adjacent to the body 151 of the driving force transmission surface 154.

The locking protrusion 155 may not be deviated from the body 151 so that the locking protrusion 155 and the locking groove 255 may not be in contact with each other when the driving force transmission surface 154 and the driving force receiving surface 254 contact each other according to the rotation of the driving shaft 110. In other words, the locking protrusion 155 may be formed within the outer circumferential surface of the body 151.

The locking protrusion 155 may be formed to extend vertically from the driving force transmission surface 154. The locking protrusion 155 may be formed to be perpendicular to the driving force transmission surface 154 such that the locking groove 255 coupled thereto may not be axially deviated by an external force.

The upper surface of the axial protrusion 153 in the direction of the driving shaft may be formed of a contact surface 156 and an inclined surface 157. The contact surface 156 may contact a guide surface 256 (see FIG. 5) of the passive coupler 250 and move along the guide surface 256.

The inclined surface 157 may be inclined downwardly in the direction of the body 151 from the contact surface 156. The inclined surface 157 may be formed to be inclined corresponding to the guide surface 256. When the locking protrusion 155 is coupled to the locking groove 255, the inclined surface 158 may be formed so that the axial protrusion 153 may not contact the guide surface 256. The axial protrusion 153 may easily rotate along the guide surface 256 inside the passive coupler 250 by the inclined surface 157.

Figure 5:
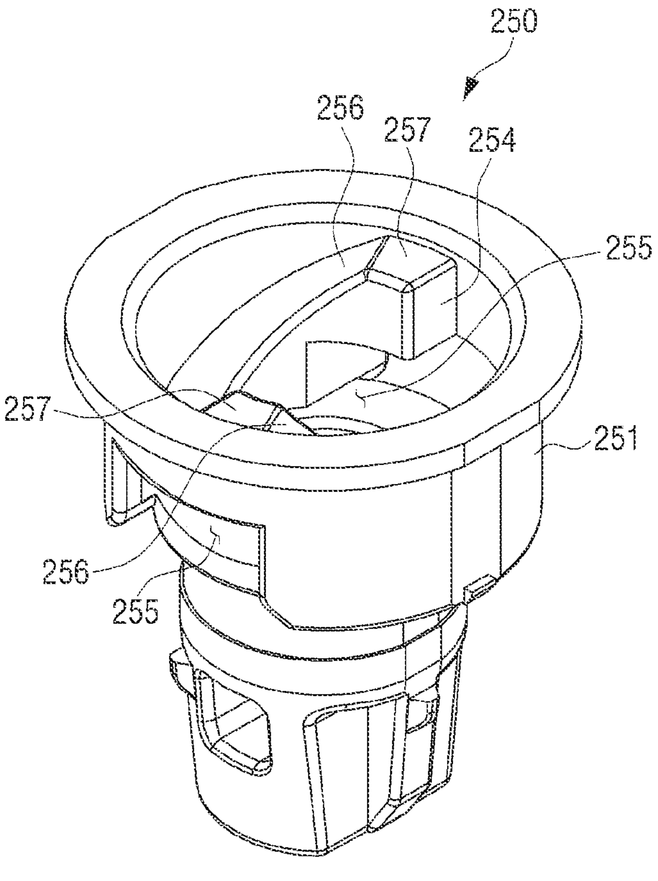
FIG. 5 is a perspective view illustrating a passive coupler according to an example.

FIG. 5 is a perspective view illustrating a passive coupler according to an example.

Referring to FIG. 5, the passive coupler 250 may be formed to have a space such that the axial protrusion 153 of the driving coupler 150 could be inserted thereto.

The driving coupler 150 may be inserted into the inside of the passive coupler 250 by the rotation in the first direction R1 to be engage with the passive coupler 250.

The passive coupler 250 may include a driving force receiving surface 254 formed inwardly its one end to correspond to the driving force transmission surface 154, and a locking groove 255 concavely formed in the rotational direction of the driving shaft 110 from the driving force receiving surface 254.

The driving force receiving surface 254 may extend along the driving shaft 110 inside the passive coupler 250. The locking groove 255 may be formed on one end adjacent to the developing cartridge 200 of the driving force receiving surface 254.

The locking groove 255 may be concavely formed to be perpendicular to the driving force transmission surface 154. The locking groove 255 may be formed to be perpendicular to the driving force receiving surface 254 such that the locking protrusion 155 coupled thereto may not be axially deviated by an external force.

The upper surface of the passive coupler 250 in the direction of the driving shaft may consist of the guide surface 256 and a vertical surface 257.

The guide surface 256 may be formed to be inclined along the first rotational direction R1 of the driving shaft 110 inside the passive coupler 250. The guide surface 256 may be downwardly inclined in the direction of the developing cartridge 200.

One end of the guide surface 256 may be connected to the locking groove 255 for guiding the locking protrusion 155 of the driving coupler 150 to the locking groove 255, and the other end of the guide surface 256 may be formed of the driving force receiving surface 254.

As described above, it has been described that the locking protrusion 155 is formed in the driving coupler 150, and the locking groove 255 is formed in the passive coupler 250, but to the extent necessary, the locking groove 255 may be formed in the driving coupler 150, and the locking protrusion 155 may be formed in the passive coupler 250.

The vertical surface 257 may be formed to be perpendicular to a mounting direction A of the passive coupler 250.

Figure 6:
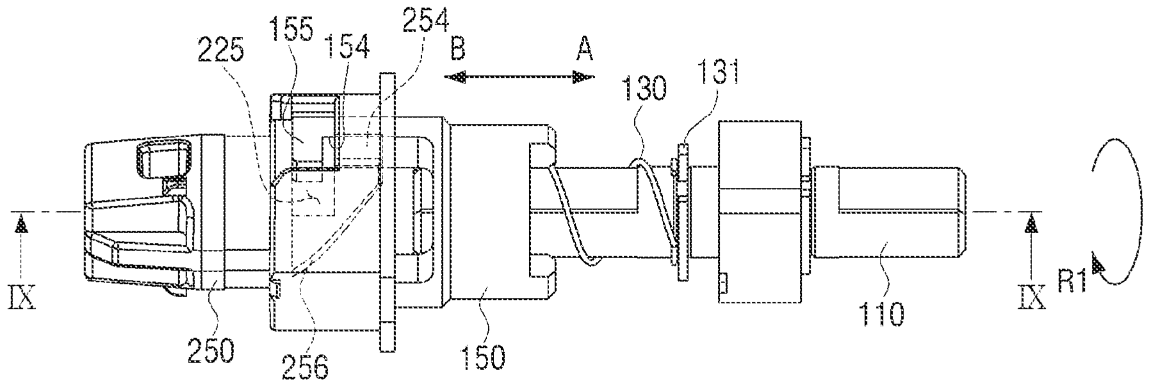
FIG. 6 is a front view illustrating a coupling state of a passive coupler and a driving coupler according to an example.

FIG. 6 is a front view illustrating a coupling state of a passive coupler and a driving coupler according to an example. For ease of explanation, referring to FIG. 6, part of the passive coupler 250 is illustrated as being transparent.

Referring to FIG. 6, when the developing cartridge 200 is mounted on the main body 100, and the contact surface 156 of the driving coupler 150 is coupled to the guide surface 256 of the passive coupler 250, the passive coupler 250 may rotate in the first direction R1 by the guide surface 256 to be coupled to the driving coupler 150.

When the developing cartridge 200 is mounted on the main body 100, and the vertical surface 257 of the passive coupler 250 is in contact with the contact surface 156 of the driving coupler 150 by the coupling, the driving coupler 150 may move a predetermined distance in the mounting direction A. In this case, the vertical surface 257 may be coupled to the contact surface 156 to face each other, and then the driving coupler 150 may rotate as the driving shaft 110 rotates in the first direction R1 and move in a separation direction B by the elastic member 130 to be inserted into the passive coupler 250.

The passive coupler 250 may be coupled to the driving coupler 150, and then locked to the driving coupler 150 by the rotation of the driving shaft 110 in the first direction R1.

The locking protrusion 155 of the axial protrusion 153 may be guide to be inserted into the locking groove 255 by the guide surface 256. The driving coupler 150 and the passive coupler 250 may be locked so that coupling may not be released by the external force applied in the separation direction of the developing cartridge 200 by the locking protrusion 155 and the locking groove 255.

In this case, the driving force transmission surface 154 may be disposed to face the driving force receiving surface 254. By rotating the driving shaft 110 in the first direction R1, the driving force transmission surface 154 and the driving force receiving surface 254 may be in surface contact with each other, so that the passive coupler 250 may rotate with the driving coupler 150.

The passive coupler 250 and the driving coupler 150 may be in plane-to-plane contact with each other along the first direction R1 to transmit a driving force. Thus, a rotational force may be stable transmitted.

Hereinafter, the locking structure and the power transmission structure between the passive coupler 250 and the driving coupler 150 will be described in detail.

Figure 7:
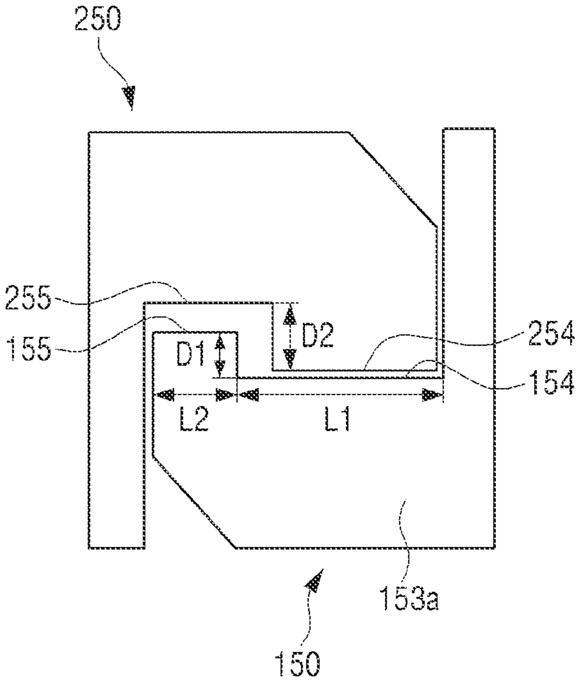
FIG. 7 is a schematic view illustrating a coupling state of a passive coupler and a driving coupler according to an example.

FIG. 7 is a schematic view illustrating a coupling state of a passive coupler and a driving coupler according to an example.

Referring to FIG. 7, when the driving coupler 150 rotates in the first direction R1, the driving force transmission surface 154 and the driving force receiving surface 254 may contact each other, and the locking protrusion 155 may be inserted into the locking groove 255. The locking protrusion 155 inserted into the locking groove 255 may not contact one end of the locking groove 255.

The locking protrusion 155 may protrude from the driving force transmission surface 154 by D1. The locking groove 255 may be formed concavely inwardly from the driving force receiving surface 254 by D2. The driving force receiving surface 254 may further protrude from the locking groove 255 than the locking protrusion 155. In other words, a length D1 by which the locking protrusion 155 protrudes may be smaller than a concave length D2 of the locking groove 255.

In addition, the width of the locking protrusion 155 may be smaller than the width of the locking groove 255.

Accordingly, by rotating the driving shaft 110, when the driving force transmission surface 154 contacts the driving force receiving surface 254, the locking protrusion 155 and the locking groove 255 may not contact with each other. The locking protrusion 155 may be formed not to be in contact the locking groove 255, but be accommodated in the locking groove 255.

The driving force transmission surface 154 may have a predetermined contact area to transmit a driving force of a predetermined magnitude or more. To be specific, a length L1 from the body 151 of the driving force transmission surface 154 may be greater than a length L2 from the driving force transmission surface 154 of the locking protrusion 155.

Accordingly, the driving coupler 150 and the passive coupler 250 may be locked to each other so that coupling therebetween may not be released by an external force while maintaining the function of transmitting the driving force.

The locking protrusion 155 and the locking groove 255 that performs the locking function of the driving coupler 150 and the passive coupler 250 may be separated from the driving force transmission surface 154 and the driving force receiving surface 254 that performs power transmission function of the driving coupler 150 and the passive coupler 250. Accordingly, the driving coupler 150 and the passive coupler 250 can perform the locking function and to not be affected due to wear caused by driving force transmission, and the driving coupler 150 and the passive coupler 250 may not be damaged by locking and can transmit power.

The driving coupler 150 and the passive coupler 250 may not only transmit a driving force from the main body 10 to the developing cartridge 200 mounted on the main body 100 of the image forming apparatus 1, but also may lock the developing cartridge 200 to the main body 100.

Figure 8:
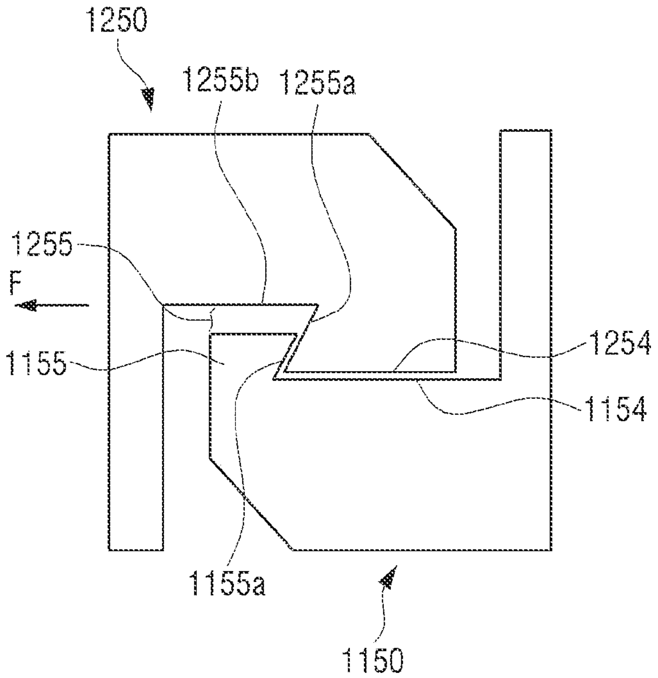
FIG. 8 is a schematic view illustrating a coupling state of a passive coupler and a driving coupler according to another example.

FIG. 8 is a schematic view illustrating a coupling state of a passive coupler and a driving coupler according to another example.

Referring to FIG. 8, according to another example, the passive coupler 1250 and the driving coupler 1150 according to another example may have the same configurations as the passive coupler 250 and the driving coupler 150 of FIG. 7. However, there is a difference in that the locking protrusion 1155 is inclined downwardly in the direction of the driving force transmission surface 1154. Therefore, the redundant description of the passive coupler 1250 and the driving coupler 1150 will be omitted.

The locking protrusion 1155 of the driving coupler 1150 according to another example may be formed to have a gradient. To be specific, the locking protrusion 1155 may be formed such that a lower side surface 1155*a* adjacent to the driving force transmission surface 1154 may be inclined downwardly in the direction of the driving force transmission surface 1154.

The locking groove 1255 may be formed to be inclined to correspond to the shape of the locking protrusion 1155 inserted inwardly. To be specific, the upper side surface 1255*a* of the locking groove may be downwardly inclined in the direction of the inner surface 1255*b* of the locking groove. That is, the upper side surface 1255*a* of the locking groove may be formed in parallel to the lower side surface 1155*a* of the locking protrusion. When an arbitrary external force (F) pulling in the separation direction is applied to the developing cartridge 200, it may prevent the coupling between the driving coupler 1150 and the passive coupler 1250 from being arbitrarily released by the locking protrusion 1155 and the locking groove 1255.

Although an axial external force (F) is applied to the developing cartridge 200, the lower side surface 1155*a* of the locking protrusion and the upper side surface 1255*a* of the locking groove may interfere with each other, so that it may fix the passive coupler 1250 not to be axially deviated.

Therefore, the coupling between the driving coupler 1150 and the passive coupler 1250 may become stronger by the locking protrusion 1155 and the locking groove 1255.

Figure 9A:
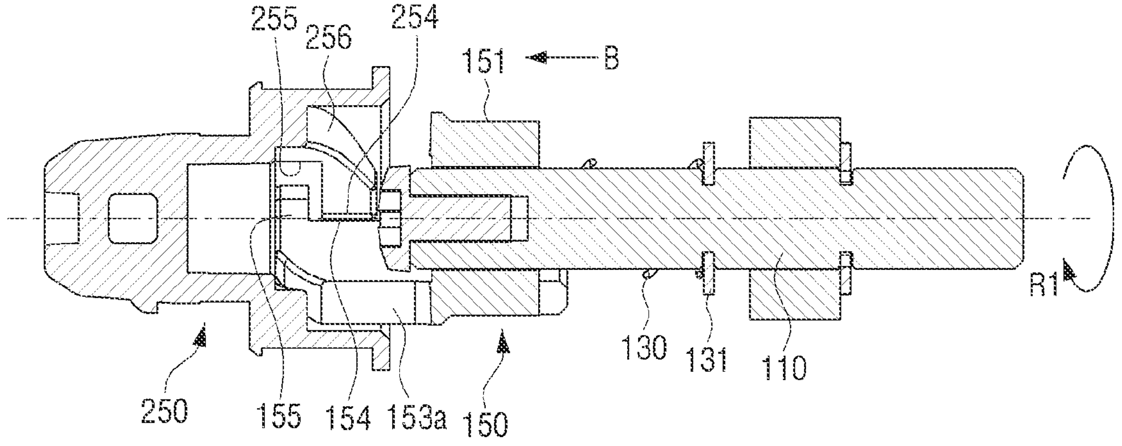
FIG. 9A is a cross-sectional view taken along line IX-IX of FIG. 6.
Figure 9B:
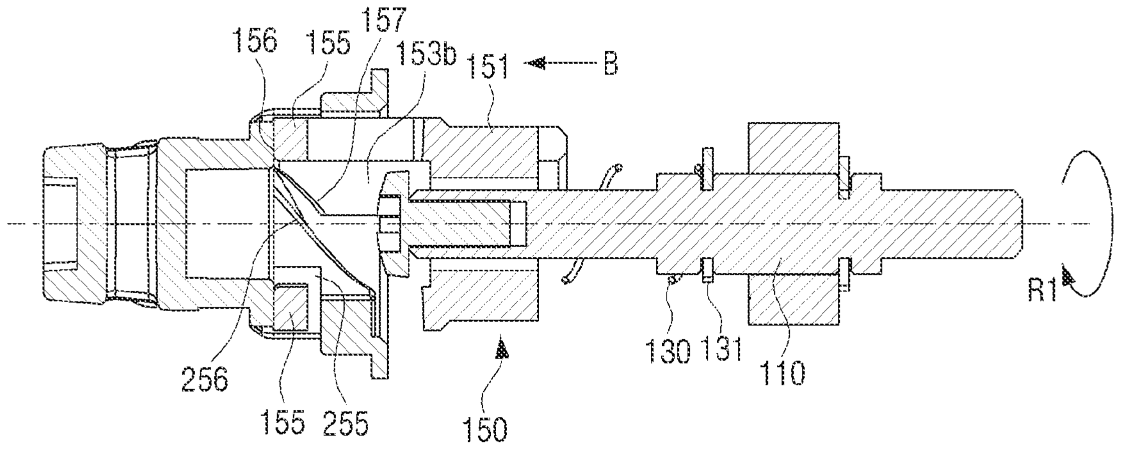
FIG. 9B is a cross-sectional view taken along a direction perpendicular to line IX-IX of FIG. 6.

FIG. 9A and FIG. 9B are cross-sectional views illustrating a state in which a passive coupler and a driving coupler are locked according to an example. FIG. 9A is a cross-sectional view taken along line IX-IX of FIG. 6, and FIG. 9B is a cross-sectional view taken along a direction perpendicular to line IX-IX of FIG. 6.

Referring to FIG. 9A and FIG. 9B, the developing cartridge 200 may be mounted on the main body 100 by the coupling between the driving coupler 150 and the passive coupler 250. Referring to FIG. 9A and FIG. 9B, for ease of explanation, the developing cartridge 200 connected to the passive coupler 250 will be omitted.

When the developing cartridge 200 is mounted on the main body 100, the passive coupler 250 of the developing cartridge 200 may contact the driving coupler 150 outwardly protruding from the main body 100. When the developing cartridge 200 is mounted on the main body 100, the guide surface 256 of the passive coupler 250 may contact the contact surface 156 of the axial protrusion 153 of the driving coupler 150.

When the developing cartridge 200 is mounted on the main body 100, the driving motor 120 may rotate in the first direction R1 in forming an image. The driving shaft 110 connected to the driving motor 120 may rotate in the first direction R1 by rotating the driving motor 120 in the first direction R1.

The driving coupler 150 may rotate in the first direction R1 by the rotation of the driving shaft 110 in the first direction R1. The driving coupler 150 may rotate in the first direction R1 and move in a direction of the passive coupler (B) to be inserted into and coupled to the passive coupler 250. The passive coupler 250 may relatively rotate with respect to the driving coupler 150 to be coupled to the driving coupler 150.

The passive coupler 250 may be fixed in a state where the developing cartridge 200 is mounted, and the driving coupler 150 may rotationally move in the direction of the passive coupler (B) such that the locking protrusion 155 may be inserted into the locking groove 255 along the guide surface 256 by the rotation of the driving coupler 150 in the first direction R1. The locking protrusion 155 may be inserted into the locking groove 255 to lock the passive coupler 250 to the driving coupler 150 such that the developing cartridge 200 may not be deviated in the axial direction.

In this case, the driving force transmission surface 154 of the driving coupler and the driving force receiving surface 254 of the passive coupler may be disposed to face each other, so that they are in contact with each other. The driving force transmission surface 154 may be in surface contact with the driving force receiving surface 254 to rotate the passive coupler 250 in the first direction R1. The developing cartridge 200 may be driven by receiving a driving force through the driving force transmission surface 154 and the driving force receiving surface 254.

The locking protrusion 155 may not contact the inner surface of the locking groove 255, but may contact the driving force transmission surface 154 and the driving force receiving surface 254. The locking groove 255 may be formed concavely inwardly from the driving force receiving surface 254 with a length greater than a length in which the locking protrusion 155 protrudes from the driving force transmission surface 154.

While the driving force transmission surface 154 and the driving force receiving surface 254 are in surface contact with each other to transmit a driving force, the locking protrusion 155 and the locking groove 255 may not be in contact with each other, so that wear caused by the contacting may not occur. Accordingly, the driving coupler 150 and the passive coupler 250 may maintain a fixed coupling force for a long period of time.

In addition, although the locking protrusion 155 or the locking groove 255 is damaged, the driving coupler 150 and the passive coupler 250 may still transmit a driving force, and thus the durability of the product may be enhanced.

Figure 10A:
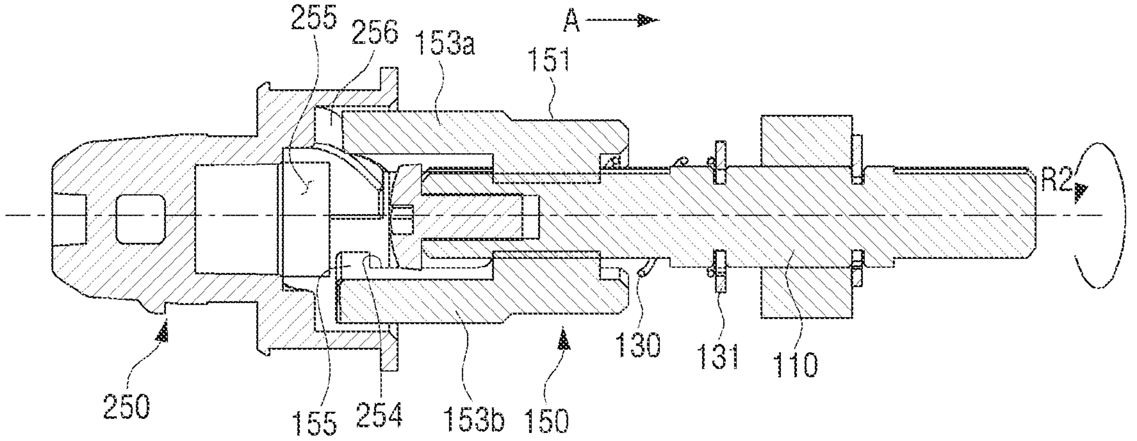
FIG. 10A is a cross-sectional view taken along a direction of line IX-IX of FIG. 6 in a state where a passive coupler and a driving coupler are unlocked according to an example.
Figure 10B:
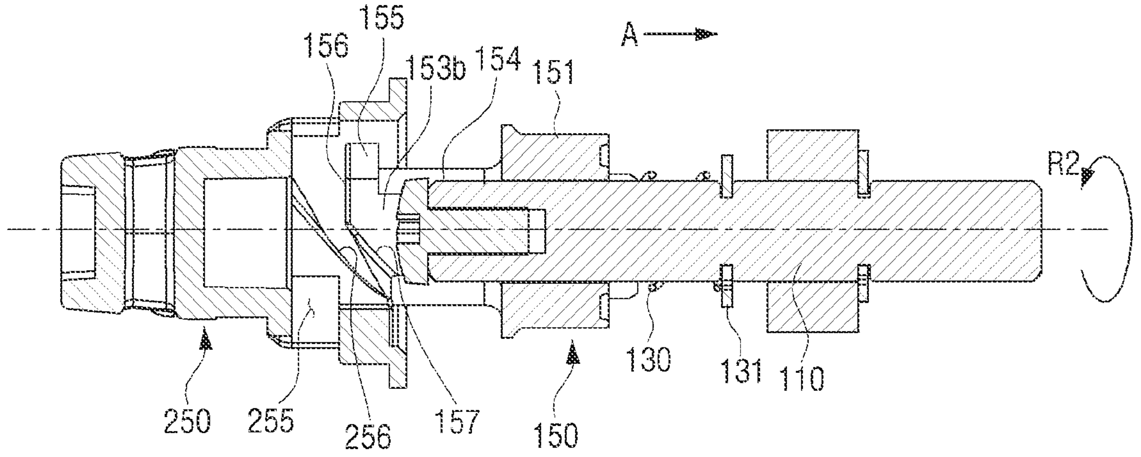
FIG. 10B is a cross-sectional view taken along a direction perpendicular to line IX-IX of FIG. 6 when a passive coupler and a driving coupler are unlocked according to an example.

FIG. 10A and FIG. 10B are cross-sectional views illustrating a state in which a passive coupler and a driving coupler are unlocked.

Referring to FIG. 10A and FIG. 10B, when the developing cartridge 200 needs to be replaced, the driving motor 120 may rotate in the second direction R2. The driving shaft 110 connected to the driving motor 120 may rotate in the second direction R2 by the rotation of the driving motor 120 in the second direction R2.

The driving coupler 150 may also rotate in the second direction R2 by the rotation of the driving shaft 110 in the second direction R2. The driving coupler 150 may be unlocked from the passive coupler 250 of the developing cartridge 200 by the rotation of the driving coupler 150 in the second direction R2. The driving coupler 150 may rotationally move in an opposite direction of the passive coupler 250 (A).

The driving coupler 150 may rotationally move in the mounting direction (A) such that the locking protrusion 155 may be detached from the locking groove 255 to move along the guide surface 256 by the rotation in the second direction R2. The locking protrusion 155 may be detached from the locking groove 255 and unlock the passive coupler 250 from the driving coupler 150 so that developing cartridge 200 may be detached from the main body 100 to move in a separation direction (B).

When the driving coupler 150 rotates in the second direction R2, the locking protrusion 155 may move in the mounting direction A by pressurizing the guide surface 256 so that the driving coupler 150 may be unlocked from the passive coupler 250.

When there is a load in the developing cartridge 200, if the driving coupler 150 rotates in the second direction R2, the driving coupler 150 may be unlocked from the passive coupler 250 to linearly move in the mounting direction A by the elastic member 130.

When there is no load in the developing cartridge 200, if the driving coupler 150 rotates in the second direction R2, the driving coupler 150 may be unlocked from the passive coupler 250 to pressurize the guide surface 256 of the passive coupler 250 and rotate in the second direction R2 together with the passive coupler 250.

The driving force transmission surface 154 and the driving force receiving surface 254 in surface contact with each other may be spaced apart from each other by the rotation of the driving coupler 150 in the second direction. Accordingly, the rotational force of the driving motor 120 may not be transmitted to the developing cartridge 200.

The image forming apparatus 1 according to an example may not only transmit a driving force to the developing cartridge 200 through the driving coupler 150 and the passive coupler 250, but also fix and couple the developing cartridge 200 into the main body 100. The driving coupler 150 and the passive coupler 250 may have a simple structure to manufacture because the locking structure and the power transmission structure are integrally formed.

In addition, when the driving coupler 150 and the passive coupler 250 are coupled to drive, the locking protrusion 155 and the locking groove 255 having the locking structure may not contact each other, but only the driving force transmission surface 154 and the driving force receiving surface 254 having the power transmission structure may contact each other, thereby increasing the durability of the product.

Although examples have been shown and described, changes may be made to these examples without departing from the principles and spirit of the disclosure. Accordingly, the scope of the disclosure is not construed as being limited to the described examples, but is defined by the appended claims as well as equivalents thereto.

What is claimed is:

1. An image forming apparatus, comprising:

a frame;

a shaft supported by the frame; and a first coupler including:

a body coupled to one end of the shaft, the body having a first surface and a protrusion protruding from the first surface, wherein the protrusion is to lock with a groove of a second coupler of a cartridge to mount the cartridge to the frame, wherein the shaft is to provide a rotational force to the first coupler in a first rotational direction to rotate the protrusion of the first coupler in the first rotational direction and to insert the protrusion into the groove of the second coupler to lock with the second coupler, and wherein the first surface of the first coupler is to contact a second surface of the second coupler to transmit the rotational force to the second coupler in the first rotational direction.

2. The image forming apparatus of claim 1, wherein the first coupler is to rotate in a second rotational direction to unlock the protrusion from the groove to unlock the first coupler of the first coupler from the second coupler and to space apart the first surface from the second surface.

3. The image forming apparatus of claim 1, wherein the first surface of the first coupler is located on a side surface of the body, and the protrusion protrudes from the side surface along a circumference of the body, and wherein, based on the cartridge being mounted on the frame, the first surface of the first coupler is to contact the second surface of the second coupler located at one end of the second coupler and the protrusion is lockable with the groove of the second coupler located at the second surface.

4. The image forming apparatus of claim 1, wherein the protrusion protrudes from an end opposite to another end of the first surface that is adjacent to the body.

5. The image forming apparatus of claim 1, wherein the first surface of the first coupler is to contact the second surface of the second coupler that protrudes from the groove.

6. The image forming apparatus of claim 1, wherein the groove has a width which is greater than a width of the protrusion.

7. The image forming apparatus of claim 1, wherein the protrusion extends vertically from the first surface of the first coupler.

8. The image forming apparatus of claim 1, wherein an upper surface of the body is to contact an inclination of a guide surface located in the second coupler and inclined along the first rotational direction of the first shaft.

9. The image forming apparatus of claim 1, wherein the cartridge includes an image carrier and a developing roller to develop the image carrier, and wherein the first coupler and the second coupler are to transmit the rotational force of the first shaft to the image carrier or a rotational shaft of the developing roller.

10. The image forming apparatus of claim 1, further comprising:

a motor to rotate in the first rotational direction to provide the rotational force to the first shaft, or to rotate in a second rotational direction to provide a rotational force opposite to the first rotational direction.

11. A cartridge to detachably attach to an image forming apparatus, the cartridge comprising:

a rotational member including a first shaft; and a first coupler to transmit a force in a rotational direction of a second shaft of the image forming apparatus to the first shaft, wherein the first coupler includes:

a first surface located at one end of the first coupler; and a groove located in the rotational direction of the second shaft from the first surface.

12. The cartridge of claim 11, wherein the groove is lockable with a protrusion of a second coupler coupled to one end of the second shaft.

13. The cartridge of claim 12, wherein the groove has a width which is greater than a width of the protrusion.

14. The cartridge of claim 12, wherein the protrusion corresponds to an inclination of the groove with respect to a lower surface of the groove.

15. The cartridge of claim 12, wherein an upper surface of the second coupler is to contact an inclination of a guide surface located in the first coupler and inclined along the rotational direction of the first shaft.

16. The cartridge of claim 15, wherein one end of the guide surface connected to the groove is to guide the protrusion to the groove.

17. The cartridge of claim 11, wherein the first coupler includes a surface located inside the first coupler and inclined along the rotational direction of a second shaft of the image forming apparatus.

18. The cartridge of claim 11, wherein the first surface of the first coupler is to contact a second surface of a second coupler to receive the force in the rotational direction from the second shaft of the image forming apparatus.

19. The cartridge of claim 18, wherein the first coupler is to rotate in a second rotational direction to unlock the protrusion from the groove to unlock the first coupler of the first coupler from the second coupler and to space apart the first surface from the second surface.

20. The cartridge of claim 18, wherein the first surface of the first coupler is to contact the second surface of the second coupler that protrudes from the groove.

* * * * *